United States Patent [19]

Baker

[11] Patent Number: 4,682,499

[45] Date of Patent: Jul. 28, 1987

[54] PRESSURE TRANSMITTER

[75] Inventor: Gerald S. Baker, Houston, Tex.

[73] Assignee: Cameron Iron Works, Inc., Houston, Tex.

[21] Appl. No.: 861,457

[22] Filed: May 9, 1986

[51] Int. Cl.[4] ............................................. G01L 7/16
[52] U.S. Cl. ...................................... 73/701; 73/706; 73/711; 73/716; 73/744
[58] Field of Search ................ 73/701, 706, 711, 716, 73/744, 745, 746, 723

[56] References Cited

U.S. PATENT DOCUMENTS

| 32,514 | 6/1861 | Finnegan et al. | 73/711 |
| 1,400,550 | 12/1921 | Hopwood | 73/716 |
| 2,013,810 | 9/1935 | Shimek | 265/47 |
| 2,297,679 | 10/1942 | Allen | 73/706 |
| 3,244,007 | 4/1966 | Alberani | 73/716 |
| 3,375,721 | 4/1968 | Joesting | 73/716 |
| 4,051,729 | 10/1977 | Thordarsson | 73/716 |
| 4,166,396 | 9/1979 | Baker | 73/706 |
| 4,193,307 | 3/1980 | Baker et al. | 73/701 |

OTHER PUBLICATIONS

Beard, "Control Valves", Process Control Series-No. 1, pp. 150-167.

Primary Examiner—Donald O. Woodiel
Attorney, Agent, or Firm—Vinson & Elkins

[57] ABSTRACT

An improved pressure transmitter having a body with signal pressure responsive means and output pressure means having pressure responsive means, a supply of fluid pressure to said output pressure means, and adjusting means interposed between said signal pressure responsive means and said output pressure responsive means to adjust the force transmitted between said two pressure responsive means.

4 Claims, 9 Drawing Figures

PRESSURE TRANSMITTER

BACKGROUND

The present invention relates to an improved pressure transmitter. Pressure transmitters have been used to sense a signal pressure and provide an indication of such signal pressure as an output in a pressure range which is substantially reduced with respect to the signal pressure. Such output is commonly conducted to a pressure gage which is calibrated to read the larger signal pressure. Such devices eliminate the need for conducting the high pressure signal to the gage which reduces costs and eliminates the danger of high pressure equipment. FIG. 1 of the drawings is an example of such prior art pressure transmitter.

Another example of a prior pressure transmitter is disclosed in U.S. Pat. No. 4,193,307 to Baker et al. This device is used as a part of a system to provide an indication of subsea well head pressure to the surface.

One disadvantage of the prior pressure transmitters is that the tolerances on the effective pressure areas need to be small to ensure the accuracy of the desired output range.

The prior art contains many structures such as valves and gages which provide an accessible adjustment to adjust the gage reading (U.S. Pat. Nos. 32,514, 2,297,679 and 4,166,396), to adjust a cable tension sensing device for changes in the mechanical advantages used in the cable system (U.S. Pat. No. 2,013,810) and to adjust the sensitivity of valve positioners (disclosed in Control Valves by Chester S. Beard, Instruments Publishing Company, 1960—pages 150 through 167). The gage adjustment involves the shifting of the pivot point of a beam interposed between the pressure sensing element and the pressure indicating element to provide a correction of the gage reading. The adjustment feature of the above mentioned valve positioners includes the movement of a pivot pin in a system of levers.

While such adjustment features are known in the prior valve and gage art, no adjustment has been suggested for a pressure transmitter which would be easy and simple to incorporate therein without a substantial increase in cost.

SUMMARY

The improved pressure transmitter of the present invention includes a body having a signal pressure responsive means, an output pressure means having a pressure responsive means, a supply of fluid pressure to said output pressure means and adjusting means interposed between said signal pressure responsive means and said output pressure responsive means to adjust the force transmitted therebetween whereby the output range of said output pressure means is maintained within a preselected range. The adjusting means includes a pair of levers with an adjustable fulcrum, preferably in the form of a cylinder positioned between the levers and having a rod threaded therethrough. Movement of the cylinder responsive to rotation of the threaded rod changes the effective lengths of both of the levers and thus changes the force transmitted to the output pressure means from the force resulting from the signal pressure being exerted on the signal pressure responsive means and thereby changes the gain or ratio of the output pressure to the signal pressure.

An object of the present invention is to provide an improved pressure transmitter which can have its output readily and quickly calibrated.

Another object is to provide an improved pressure transmitter having a calibrating adjustment which is readily accessible and inexpensive.

A further object is to provide an improved pressure transmitter having an adjustable output range.

Still another object is to provide an improved pressure transmitter whose output is linearly proportional to the signal pressure.

An additional object is to provide an improved pressure transmitter whose gain is readily adjustable.

BRIEF DESCRIPTION OF THE DRAWING

These and other objects and advantages are hereinafter set forth and explained with respect to the drawings wherein.

DESCRIPTION OF THE PREFERRED EMBODIMENT

Figure 1:
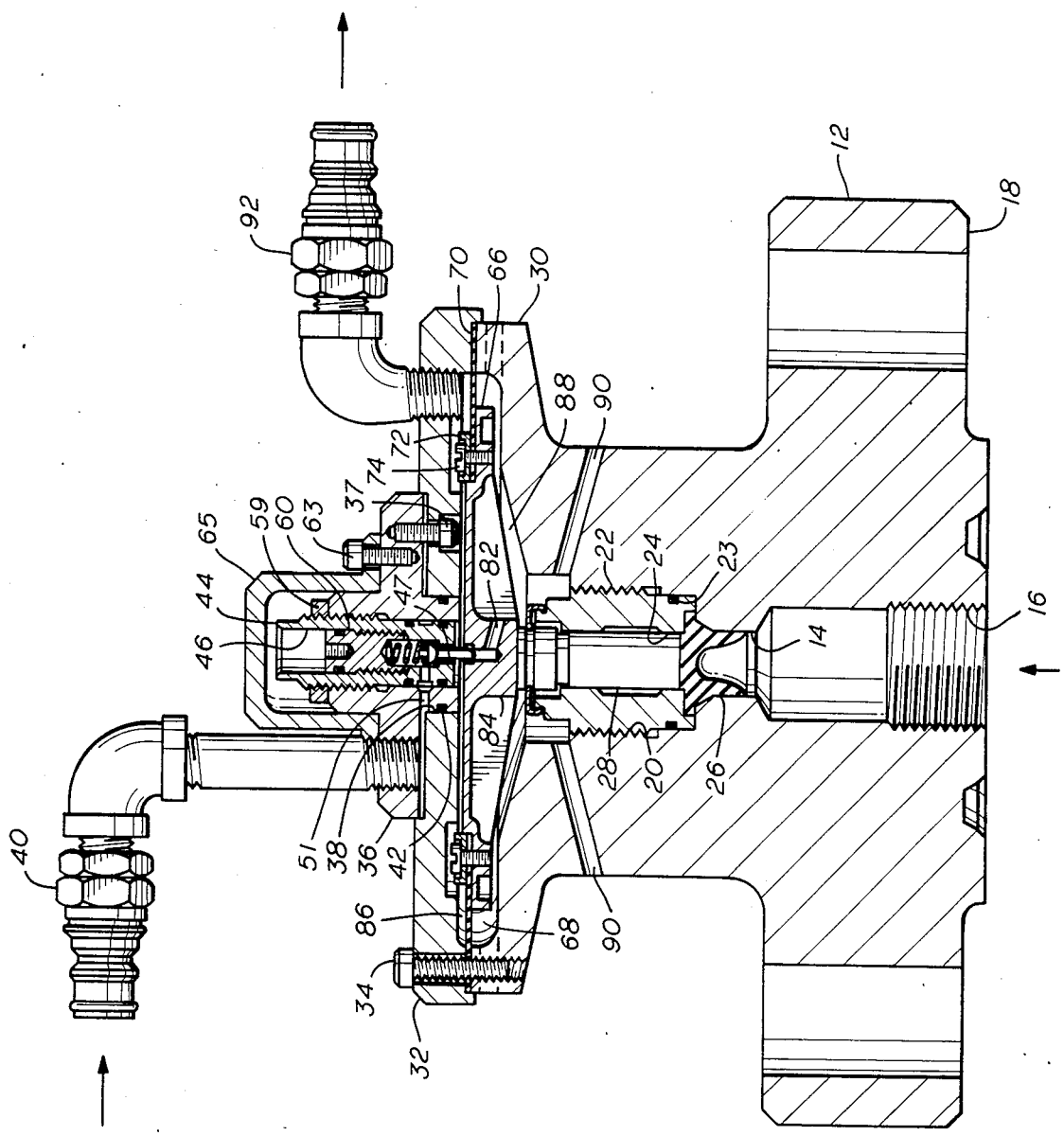
FIG. 1 is a sectional view of a pressure transmitter of the prior art.
Figure 1A:
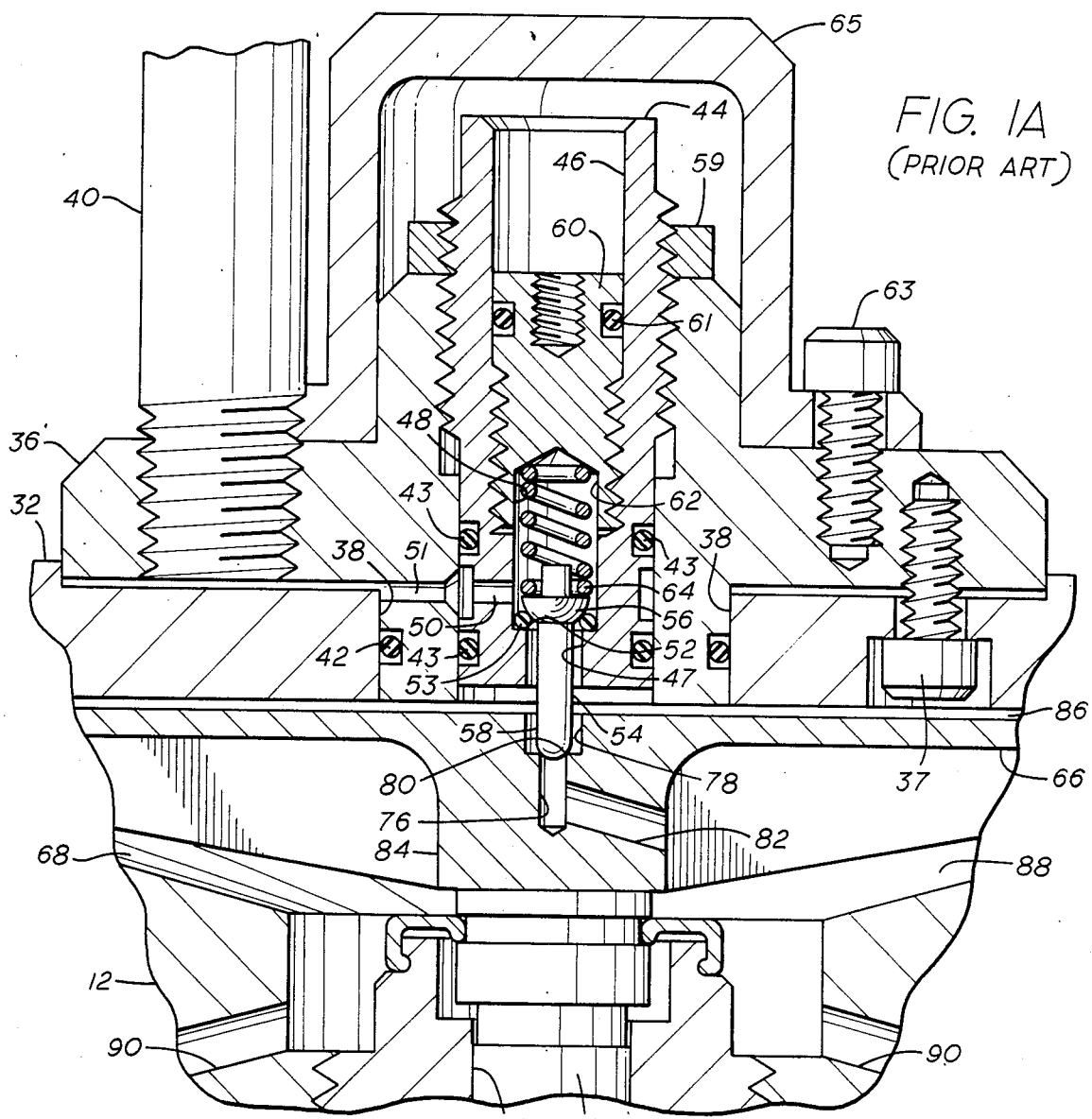
FIG. 1A is an enlarged sectional view of the valving portion of the transmitter shown in FIG. 1.

As shown in FIGS. 1 and 1A pressure transmitter 10 is an example of one form of pressure transmitter commonly used in the prior art. Transmitter 10 includes body 12 having central bore 14 extending therethrough from inlet 16 which is surrounded by flange 18 for connection to the pressure vessel or other equipment whose pressure is to be sensed and delivered through a suitable line to the desired equipment by transmitter 10. Counterbore 20 is provided in body 12 at the opposite end of bore 14 from inlet 16 and is internally threaded to receive sleeve 22. Sleeve 22 is threaded on its exterior and has a bore 24 therethrough which determines the effective pressure area of the inlet end of transmitter 10. Sealing plug 26 is positioned within bore 14 and has its inner end in contact with load pin 28 which is positioned in bore 24. O ring 23 seals the outside diameter of sleeve 22 with respect to counterbore 20 and central bore 14.

As best shown in FIG. 1A, the portion of body 12 surrounding counterbore 20 is formed as annular flange 30 for receiving annular closure 32 which is secured to flange 30 by suitable means, such as cap screws 34. Bonnet 36 is secured to closure 32 by screws 37 in surrounding relationship to central bore 38 of closure 32. Line 40 connects into bonnet 36 to supply fluid under pressure for transmitting to the ultimate destination. Bonnet 36 is sealed within bore 38 by O ring 42 and valve sleeve 44 is threaded and sealed within the interior of bonnet 36. Bore 46 in sleeve 44 communicates with counterbore 48 of sleeve 44 and port 50 through sleeve 44 provides communication between counterbore 48 and the exterior of sleeve 44 and thus, to the space 51 between closure 32 and bonnet 36 so that fluid delivered through line 40 communicates to the counterbore 48 in valve sleeve 44. Sleeve 44 is sealed to the interior of bonnet 36 by O rings 43 positioned above and below port 50.

Counterbore 48 in valve sleeve 44 provides seat 52 surrounding the inner opening of bore 46 and valve member 54 having head 56 within counterbore 48 of sufficient size to seat on seat ring 53 supported on valve seat 52 with stem 58 extending through reduced bore 47 as hereinafter described. Lock nut 59 secures sleeve 44 in position. Plug 60 is threaded into the interior of valve sleeve 44 and includes bore 62 aligned with counterbore 48 for receiving spring 64 which biases valve member 54 toward its seated position with head 56 on seat ring 53. Cap 65 is secured in position over the outer ends of bonnet 36 and valve sleeve 44 by cap screws 63. Plus 60 is sealed to the interior of sleeve 44 by O ring 61.

Diaphragm plate 66 is positioned within space 68 between body 12 and the interior of closure 32 and is supported by annular diaphragm 70 which has its inner periphery secured to plate 66 by ring 72 and screws 74 and its outer periphery secured between the mating surfaces of annular flange 30 and annular closure 32. Bore 76 extends centrally into the upper surface of plate 66 and counterbore 78 provides seat 80 surrounding the upper end of bore 76. Port 82 extends through hub 84 of plate 66.

Diaphragm 70 and plate 66 divide space 68 into upper chamber output 86 and venting chamber 88. Chamber 88 is vented to the exterior of body 12 by vents 90 extending through body 12 and line 92 delivers output pressure to its desired location (not shown). The upper end of load pin 28 engages the lower surface of hub 84 on plate 66 to transmit the force resulting from the signal pressure in bore 14 exerted on pin 28.

Valve member 54 is designed to have the lower end of its stem 58 positioned within counterbore 78 and in engagement with seat 80 under certain positions of diaphragm plate 66. The source of fluid pressure delivers fluid through line 40 into space 51 between closure 32 and bonnet 36. This pressure is conducted through port 50 to counterbore 48 in valve sleeve 44 and when head 56 of valve member 54 is raised out of contact with seat ring 53 such pressure is delivered into output chamber 86. Pressure within chamber 86 is communicated through closure 32 and line 92 secured therein to the desired ultimate destination, such as a pressure gage (not shown) which may be at a remote location from the source of pressure fluid delivered to inlet 16.

The fluid pressure in chamber 86 exerts a balancing force on the top of plate 66 and diaphragm 70 and when the pressure balances the force exerted by load pin 28 on diaphragm hub 84 diaphragm 66 and valve member 54 move downward to seat head 56 of valve member 54 on seat ring 53. In the event the pressure within chamber 86 creates a greater force than the load pin force then there is further downward movement of plate 66 and the lower end of stem 58 is disengaged from seat 80 to allow pressure fluid to be vented from chamber 86 through counterbore 78, seat 80, bore 76 and port 82 into chamber 88 from which it is vented through vents 90. In this manner the output pressure delivered through line 92 is held to be proportional to the pressure in inlet 16 as determined by the ratio of the effective areas of bore 24 and of diaphragm 70. Manufacturing tolerances sometime make it quite difficult to maintain the exact area ratio. The prior art pressure transmitters did not have any way in which this area ratio could be effectively changed other than exchanging parts until a satisfactory compromise was achieved.

The improved pressure transmitter 110 of the present invention is shown in the remaining figures and is similar in many aspects to transmitter 10 but includes means for adjusting the amount of force transmitted to the diaphragm plate by its load pin to compensate for variations in manufacturing tolerances and provide a desired output range of pressure responsive to the signal pressure delivered to the inlet.

Figure 2:
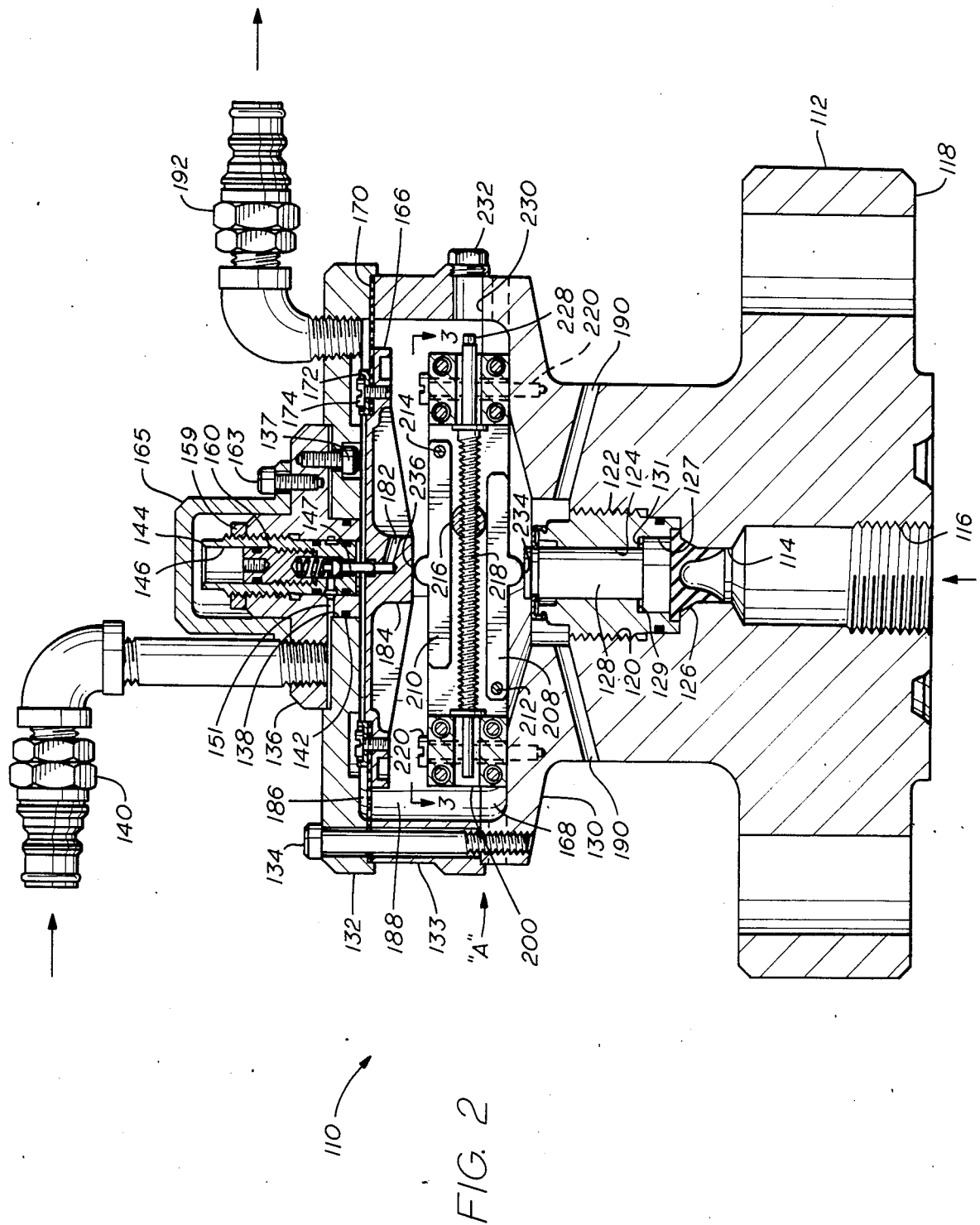
FIG. 2 is a sectional view of the improved pressure transmitter of the present invention.
Figure 2A:
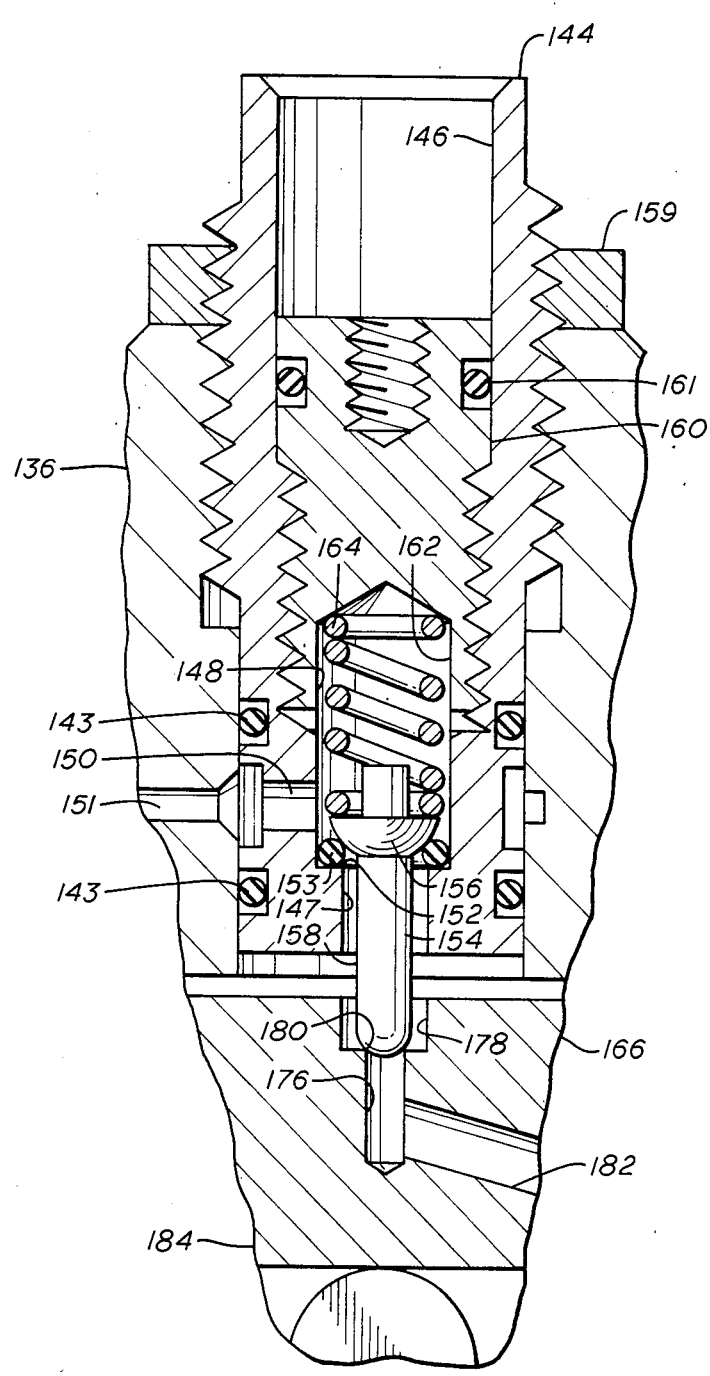
FIG. 2A is an enlarged sectional view of the valving portion of the transmitter shown in FIG. 2.
Figure 3:
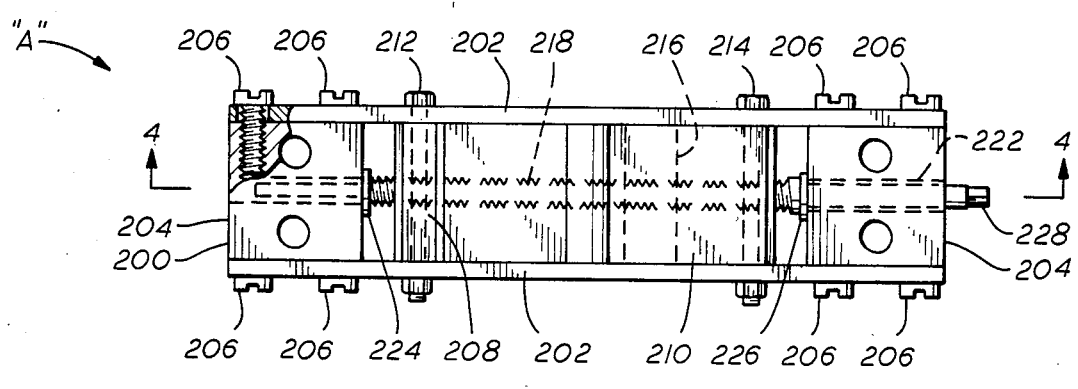
FIG. 3 is a sectional view taken along line 3—3 in FIG. 2 to illustrate the adjusting means.

As shown in FIGS. 2 and 2A, pressure transmitter 110 has body 112 with central bore 114 extending therethrough from inlet 116 surrounded by flange 118 for connection to the pressure vessel or other equipment whose pressure is to be sensed and delivered through a suitable line to the desired equipment by transmitter 110. Counterbore 120 is provided in body 112 at the opposite end of bore 114 from inlet 116 and is internally threaded to receive sleeve 122. Sleeve 122 is threaded on its exterior and has a bore 124 therethrough which determines the effective pressure area of the inlet end of transmitter 110. Sealing plug 126 is preferably made of elastomeric material and is positioned within bore 114 and has its inner end in contact with load pin 128 which is positioned in bore 124. Counterbore 127 in sleeve 122 provides shoulder 129 which provides a stop for the travel of load pin 128 by allowing its shoulder 131 to engage shoulder 129 at the uppermost desired position of its travel upward in bore 124.

The portion of body 112 surrounding counterbore 120 is formed as annular flange 130 for receiving spacer ring 133 and annular closure 132 which are secured to flange 130 by suitable means, such as cap screws 134. Adjusting means "A" is supported within spacer ring 133 as hereinafter disclosed. Bonnet 136 is secured to closure 132 by screws 137 in surrounding relationship to bore 138 of closure 132. Line 140 connects into bonnet 136 to supply fluid under pressure for transmitting to the ultimate destination. Bonnet 136 is sealed within bore 138 by O ring 142 and valve sleeve 144 is threaded and sealed within the interior of bonnet 136. Bore 146 in sleeve 144 communicates with counterbore 148 and port 150 provides communication between the counterbore 148 to the exterior of sleeve 144 and thus, to the space 151 between closure 132 and bonnet 136 so that fluid delivered through line 140 communicates to the counterbore 148 in valve sleeve 144. Sleeve 144 is sealed to the interior of bonnet 136 by O rings 143 positioned above and below port 150.

Counterbore 148 in valve sleeve 144 provides seat 152 surrounding the inner opening of bore 146 and valve member 154 having head 156 within counterbore 148 of sufficient size to seat on seat ring 153 supported on valve seat 152 and with stem 158 extending through reduced bore 147 as hereinafter described. Lock nut 159 secures sleeve 144 in position. Plug 160 is threaded into the interior of valve sleeve 144 and includes bore 162 aligned with counterbore 148 for receiving spring 164 which biases valve member 154 toward its seated position with head 156 on seat ring 153. Cap 165 is positioned over the outer ends of bonnet 136 and valve sleeve 144 by cap screws 163. Plug 160 is sealed to the interior of sleeve 144 by O ring 161.

Diaphragm plate 166 is positioned within space 168 between body 112 and the interior of closure 132 and is supported by annular diaphragm 170 which has its inner periphery secured to plate 166 by ring 172 and screws 174 and its outer periphery secured between the mating surfaces of spacer ring 133 and the annular closure 132. Bore 176 extends centrally into the upper surface of plate 166 and counterbore 178 provides seat 180 surrounding the upper end of bore 176. Port 182 extends through hub 184 of plate 166.

Diaphragm 170 and plate 166 divide space 168 into upper chamber output 186 and venting chamber 188. Chamber 188 is vented to the exterior of body 112 by vents 190 extending through body 112 and line 192 delivers output pressure to its desired location (not shown).

Valve member 154 is designed to have the lower end of its stem 158 positioned within counterbore 178 and in engagement with seat 180 under certain positions of diaphragm plate 166. The source of fluid pressure delivers fluid through line 140 into space 151 between closure 132 and bonnet 136. This pressure is conducted through port 150 to counterbore 148 in valve sleeve 144 and when head 156 of valve member 154 is raised out of contact with seat ring 153 such pressure is delivered into output chamber 186. Pressure within chamber 186 is communicated through closure 132 and line 192 secured therein to the desired ultimate destination such as a pressure gage (not shown) which may be at a remote location from the source of pressure fluid delivered to inlet 116.

The fluid pressure in chamber 186 exerts a balancing force on the top of plate 166 and diaphragm 170 and when the pressure balances the force exerted by load pin 128 through adjusting means "A" on diaphragm hub 184 diaphragm 166 and valve member 154 move downward to seat head 156 of valve member 154 on seat ring 153. In the event the pressure within chamber 186 creates a greater force than the effective load pin 128 force then there is further downward movement of plate 166 and the lower end of stem 158 is disengaged from seat 180 to allow pressure fluid to be vented from chamber 186 through counterbore 178, seat 180, bore 176 and port 182 into chamber 188 from which it is vented through vents 190.

Figure 4:
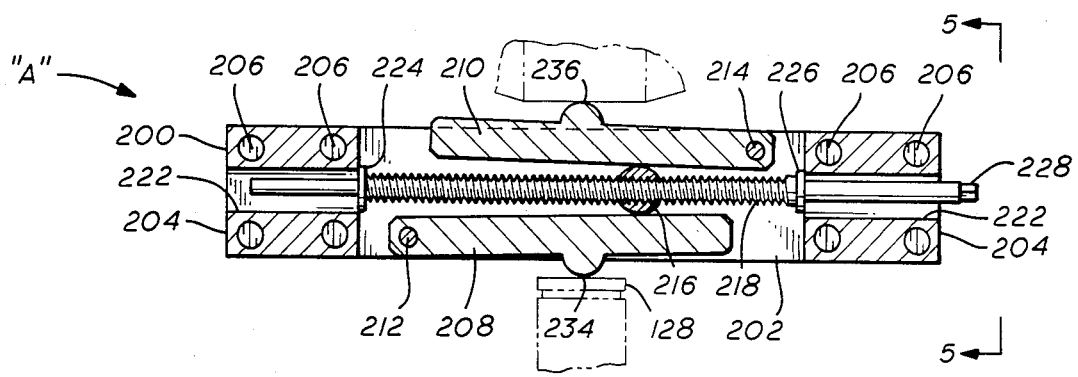
FIG. 4 is an elevation view of the adjusting means.
Figure 5:
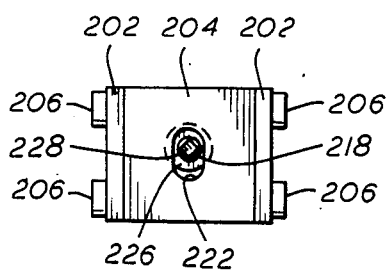
FIG. 5 is an end view of the adjusting means.
Figure 6:
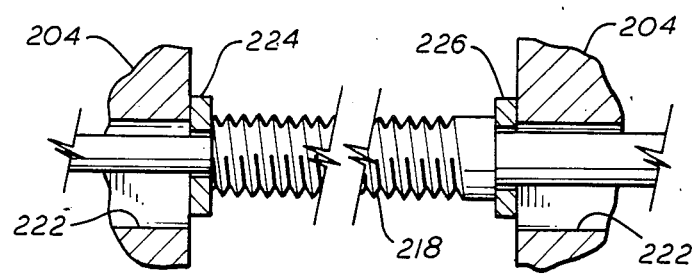
FIG. 6 is a partial detail view of the threaded rod of the adjusting means.

Adjusting means "A", as shown in FIGS. 2 through 6, includes frame 200 consisting of sides 202 and end blocks 204 secured together by screws 206 with flat levers 208 and 210 pivotally mounted in generally parallel relationship to each other by pivot pins 212 and 214 respectively, and with movable cylinder 216 therebetween. Cylinder 21 is movable responsive to rotation of threaded rod 218 which threads through the central portion of cylinder 216. Frame 200 is secured within space 188 by cap screws 220 which extend into body 112. Rod 218 extends through slots 222 in blocks 204 and includes flanges 224 and 226 which abut the inner surfaces of blocks 204 to prevent axial movement of rod 218 and ensure that rotation of rod 218 causes movement of cylinder 216 to change the ratio of force transmitted by levers 208 and 210 as hereinafter explained. End 228 of rod 218 is shaped so that rod 218 may be easily rotated. Also, end 228 is aligned with port 230 through spacer ring 133, which is normally closed by plug 232, and rod 218 is readily rotated by a suitable tool (not shown) extending through port 230. Lever 208 includes projection 234 on its lower surface and pivot pin 212 is positioned so that projection 234 engages the central upper portion of load pin 128 as shown in FIG. 4 and lever 210 includes projection 236 on its upper surface and pivot pin 214 is positioned so that projection 236 engages the lower central portion of hub 184 of diaphragm plate 166.

Figure 7:
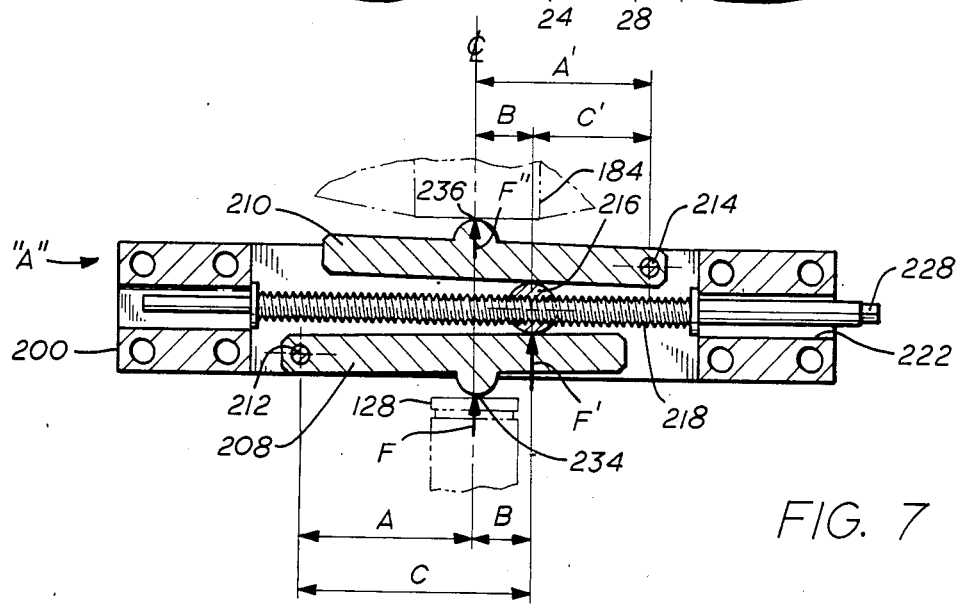
FIG. 7 is a schematic force diagram of the adjusting means.

The schematic diagram shown in FIG. 7 illustrates the function of adjusting means. As shown, the point of engagement between projection 234 on lever 208 is spaced from pivot pin 212 by the distance A and the point of engagement between projection 236 on lever 210 is spaced from pivot pin 214 by the distance A'. It is preferred that the distances A and A' be the same. The distance from pivot pin 212 to the point of engagement between lever 208 and cylinder 216 is indicated to be C or A plus B. The distance from pivot pin 214 to the point of engagement between lever 210 and cylinder 216 is indicated to be C' or A' minus B.

The force exerted on projection 234 by load pin 128 has a lever arm A and the force from lever 208 on cylinder 216 has a lever arm of A plus B. The force exerted on lever 210 by cylinder 216 has a lever arm of C' or A' minus B and the force of projection 236 on hub 184 has a lever arm of A'. The force resolution is thus resolved to be $F'$ (on cylinder 216) = F (load pin) $\times A/(A+B)$. Further $F''$ (on hub 184) = $F' \times (A'-B)/A'$. Therefore, $F'' = F \times (A-B)/(A+B)$, when $A = A'$ or when pivot pins 212 and 214 are equal distance from the contact points 234 and 236. Movement of cylinder 216 to the opposite side of the centerline will change the lever arms and thus the force relationships as is easily understood with reference to FIG. 7. With cylinder 216 aligned with the centerline of hub 184 and load pin 128 the force from load pin 128 is exactly the force exerted on hub 184. With the movement of cylinder 216 through rotation of rod 218 this relationship is changed and the ratio of force transmitted to diaphragm plate 166 is adjusted so that any slight deviation in the dimensions of the effective pressure areas of the pressure transmitter can be accommodated. Further, with this adjustable means "A", considerable adjustability in the ratio of the output pressure to the signal pressure can be made to extend the range of the use of the pressure transmitter.

What is claimed is:

1. A pressure transmitter comprising a body having a bore therethrough, a bonnet secured to said body in covering relationship to one end of said bore, pressure responsive means mounted in said bore and extending beyond the end thereof which is covered by said bonnet, pressure responsive means carried by said bonnet having a pressure output, means for delivering signal pressure to the end of said bore not covered by said bonnet, means for delivering a supply of fluid pressure to said bonnet pressure responsive means, and means interposed between the extending end of said body pressure responsive means and said bonnet pressure responsive means to adjust the force transmitted to the bonnet pressure responsive means from said body pressure responsive means to calibrate the range of said bonnet pressure responsive means output, said adjusting means includes a spacer ring secured between said body and said bonnet, a frame supported within said spacer ring, a pair of levers pivotally mounted to said frame with one lever in engagement with the extending end of said body pressure responsive means and the other lever in engagement with the bonnet pressure responsive means, a movable cylinder between said levers, and means for moving said cylinder along said levers to change their effective lever arms.

2. A pressure transmitter according to claim 1 wherein said cylinder moving means includes a threaded rod supported by and extending through said frame and threadedly through said cylinder, and means on said rod for rotating the rod.

3. A pressure transmitter according to claim 2 including an opening through said spacer ring to provide access to said rod rotating means.

4. A pressure transmitter comprising a body having a bore therethrough, a bonnet secured to said body in covering relationship to one end of said bore, pressure responsive means mounted in said bore and extending beyond the end thereof which is covered by said bonnet, pressure responsive means carried by said bonnet having a pressure output, means for delivering signal pressure to the end of said bore not covered by said bonnet, means for delivering a supply of fluid pressure to said bonnet pressure responsive means, and means interposed between the extending end of said body pressure responsive means and said bonnet pressure responsive means to adjust the force transmitted to the bonnet pressure responsive means from said body pressure responsive means to calibrate the range of said bonnet pressure responsive means output, said adjusting means including a pair of spaced apart levers having opposed pivot points, a cylinder, and a threaded rod threading through the cylinder and being positioned between said levers as a fulcrum and being movable responsive to rotation of said threaded rod to vary the effective lever arms of said levers.

* * * * *